United States Patent
Rodriguez et al.

(10) Patent No.: US 11,176,202 B2
(45) Date of Patent: Nov. 16, 2021

(54) RANKING RESULTS OF SEARCHES OF DATABASES

(71) Applicant: salesforce.com, inc., San Francisco, CA (US)

(72) Inventors: Mario Sergio Rodriguez, Santa Clara, CA (US); Christian Posse, Belmont, CA (US); Rohit Kapoor, San Francisco, CA (US); Muhammad Tayyab Javed, Breingsville, CA (US)

(73) Assignee: salesforce.com, inc., San Francisco, CA (US)

( * ) Notice: Subject to any disclaimer, the term of this patent is extended or adjusted under 35 U.S.C. 154(b) by 87 days.

(21) Appl. No.: 16/752,295

(22) Filed: Jan. 24, 2020

(65) Prior Publication Data

US 2021/0081457 A1    Mar. 18, 2021

Related U.S. Application Data

(60) Provisional application No. 62/902,345, filed on Sep. 18, 2019.

(51) Int. Cl.
| | |
|---|---|
| *G06F 16/00* | (2019.01) |
| *G06F 16/9038* | (2019.01) |
| *G06F 16/9035* | (2019.01) |
| *G06F 16/903* | (2019.01) |
| *G06F 16/901* | (2019.01) |
| *G06F 16/2457* | (2019.01) |

(52) U.S. Cl.
CPC .... *G06F 16/9038* (2019.01); *G06F 16/24578* (2019.01); *G06F 16/902* (2019.01); *G06F 16/9035* (2019.01); *G06F 16/90344* (2019.01)

(58) Field of Classification Search
CPC .................................................. G06F 16/24578
See application file for complete search history.

(56) References Cited

U.S. PATENT DOCUMENTS

| | | | |
|---|---|---|---|
| 7,693,827 B2 | 4/2010 | Lamir et al. | |
| 7,827,170 B1 | 11/2010 | Horling et al. | |
| 9,519,715 B2 | 12/2016 | Dedhia | |
| 2002/0082778 A1 | 6/2002 | Barnett et al. | |
| 2005/0071328 A1 | 3/2005 | Lawrence | |
| 2005/0076003 A1 | 4/2005 | DuBose et al. | |
| 2011/0105143 A1* | 5/2011 | Harple | G06F 16/29 455/456.1 |
| 2012/0323953 A1* | 12/2012 | Ortega | G06F 16/907 707/767 |

* cited by examiner

*Primary Examiner* — Ajith Jacob
(74) *Attorney, Agent, or Firm* — Kowert, Hood, Munyon, Rankin & Goetzel, P.C.

(57) ABSTRACT

A computer system is configured to receive a plurality of previous user selection by a user of previous database entries, each of which has as plurality of database field. The computer system is configured to analyze the plurality of previous user selections to identify how frequently the same values are included in the various previous database entries. The computer system is configured to determine weights for the various database fields and rank subsequent search results for a subsequent search of the database based on the determined weights.

20 Claims, 10 Drawing Sheets

| Cust. # | Customer Name | Location | Contact | Nearest Sales Office | Purchased Flavor |
|---|---|---|---|---|---|
| 1 | Acme Grocery, Inc. | Austin | Jennifer Walters | Houston | Vanilla |
| 2 | Acme Ice Cream Parlor | Toronto | Ramona Reynolds | New York | Strawberry |
| 3 | Acme Ice Cream Shoppe, Inc. | Las Vegas | Peter Parker | San Francisco | Chocolate |
| 4 | Acme Ice Cream Trucks | San Diego | Felicia Hardy | San Francisco | Vanilla |
| 5 | Colonial Food Delivery | Boston | George Washington | New York | Vanilla |
| 6 | Colonial Ice Cream Corp. | Washington | Ramona Washington | New York | Vanilla |
| 7 | Colossal Cones, LLC | Austin | Thomas Jefferson | Houston | Strawberry |
| 8 | Jones and Smith Grocery | Toronto | Charles Jones | New York | Chocolate |
| 9 | Jones-Mart, Inc. | Boston | Penelope Jones | New York | Vanilla |
| 10 | Longhorn Delivery | Dallas | George Jones | Houston | Vanilla |
| 11 | Longhorn Grocery, Inc. | Austin | Marvin Acme | Houston | Chocolate |
| 12 | Ramona's Cone's | Austin | Ramona Rogers | Houston | Chocolate |

| Access # | Customer Name | Location | Contact | Nearest Sales Office | Purchased Flavor |
|---|---|---|---|---|---|
| 1 | Acme Grocery, Inc. | Austin | Jennifer Walters | Houston | Vanilla |
| 2 | Colonial Food Delivery | Boston | George Washington | New York | Vanilla |
| 3 | Colonial Ice Cream Corp. | Washington | Ramona Washington | New York | Vanilla |
| 4 | Jones-Mart, Inc. | Boston | Penelope Jones | New York | Vanilla |
| 5 | Ramona's Cone's | Austin | Ramona Rogers | Houston | Chocolate |

| Field Weight | | | | |
|---|---|---|---|---|
| 1 | 2 | 2 | 3 | 4 |
| Customer Name | Location | Contact | Nearest Sales Office | Purchased Flavor |
| Colonial - 0.4 | Austin - 0.4 | Ramona - 0.4 | New York - 0.6 | Vanilla - 0.8 |
|  | Boston - 0.4 | Washington - 0.4 | Houston - 0.4 | Chocolate - 0.2 |
|  | Washington - 0.2 |  |  |  |

*FIG. 4B*

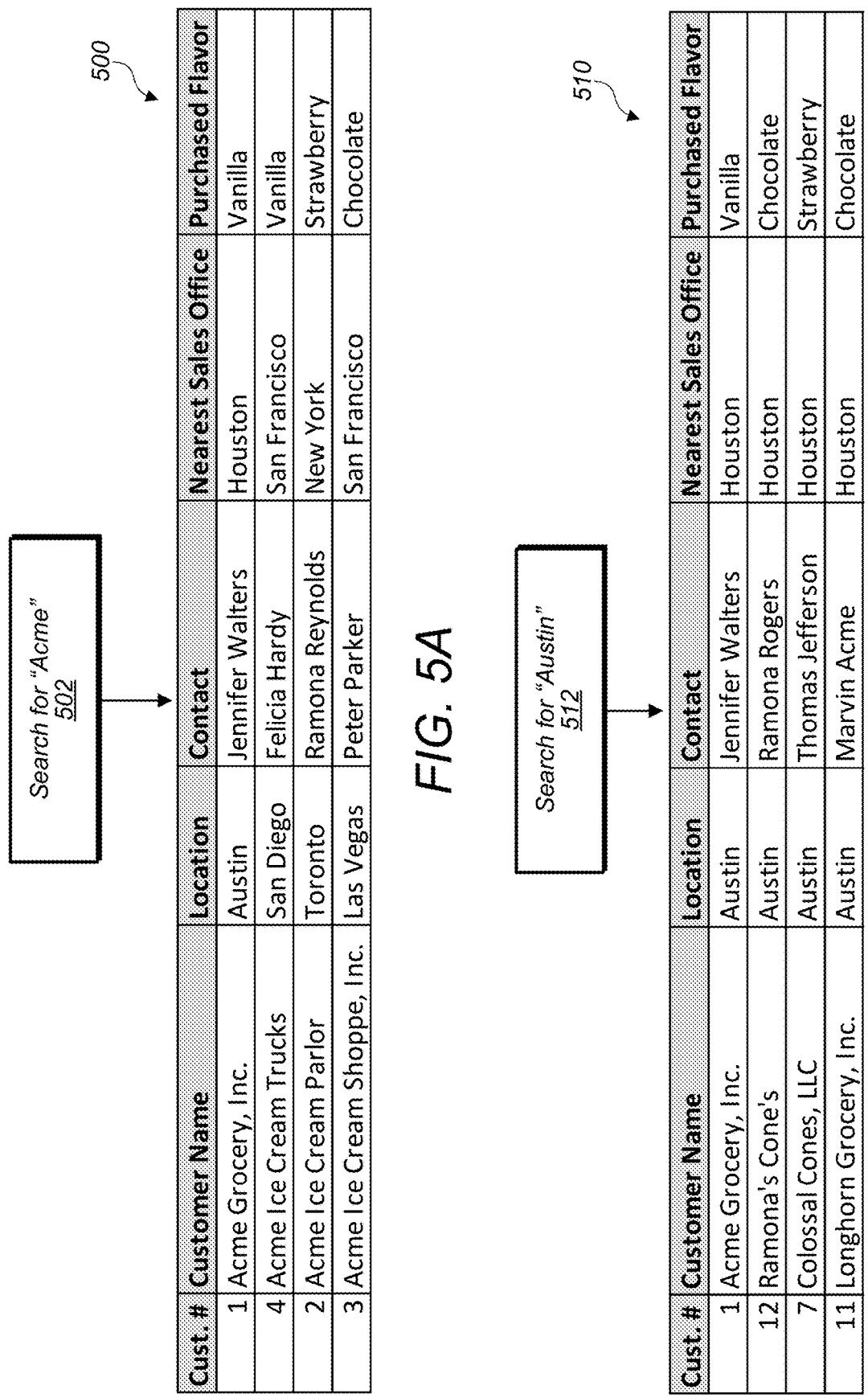

RANKING RESULTS OF SEARCHES OF DATABASES

This application claims the benefit of U.S. Prov. Appl. No. 62/902,345 filed on Sep. 18, 2019, which is incorporated by reference herein in its entirety.

BACKGROUND

Technical Field

This disclosure relates generally to ranking results from a search of a database.

Description of the Related Art

Databases can be used to store vast amounts of data. In many instances, if a user desires to access a particular entry of a database, he or she performs a search of the database. Such a search is likely to return a plurality of matches for the search criteria. When a user searches a database, the computer system performing the search decides the order in which information that is responsive to the search is presented to the user. Such ordering may be performed in any of a number of ways.

BRIEF DESCRIPTION OF THE DRAWINGS

FIG. 3 is an example of entries in a database in accordance with various embodiments.

FIG. 4A is an example of a record of a series of access to various entries in the database made by a particular user in accordance with the disclosed embodiments.

FIG. 4B is an example table of field weights and field value weights used to ranking search results in accordance with the disclosed embodiments.

FIGS. 5A-5C are examples of ranked search results in accordance with the disclosed embodiments.

Figure 1:
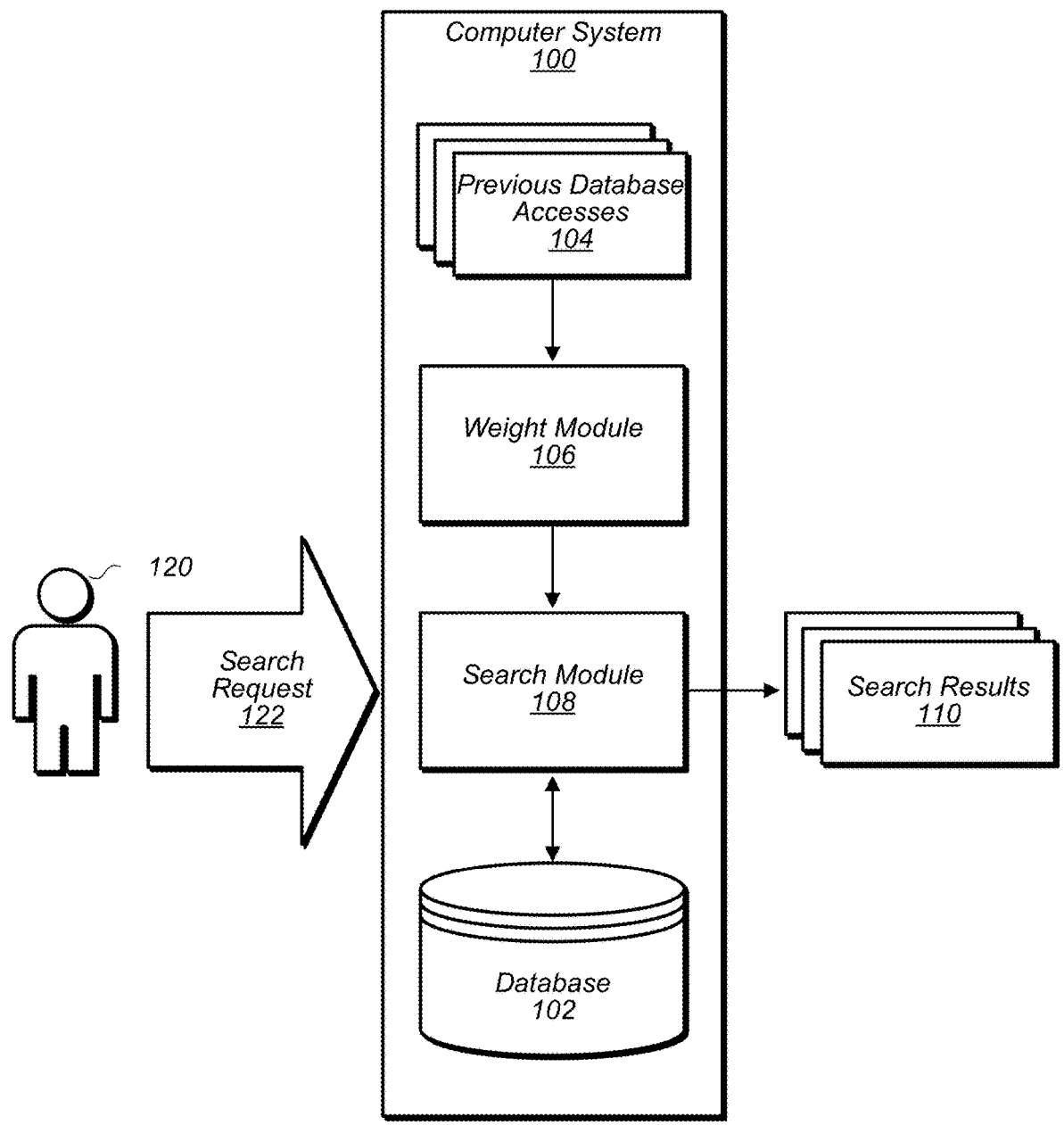
FIG. 1 is a block diagram illustrating an embodiment of a computer system configured to rank search results in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to rank search results" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" database entries would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram of an exemplary embodiment of a computer system 100 is depicted. In various embodiments, computer system 100 is configured to receive a search request 122 from a user 120 and prepare search results 110 based on the search request 122 and a ranking of the search matches by computer system 100. In various embodiments, computer system 100 includes weight module 106 and search module 108 as well as one or more database 102 that are being search and a record of previous database accesses by user 120.

In various embodiments, computer system 100 is implemented using one or more computer systems (e.g., computer servers, desktop computers, laptop computer, tablet computers, a cloud of computers, or a combination) that store data, receive user input (e.g., user selections of entries in database 102, search request 122), and present output to users (e.g., search results 110). In various embodiments, computer system 100 maintains one or more databases 102. Database 102 includes a plurality of entries having various values in various fields of the database. In various embodiments, computer system 100 is a multi-tenant computer system having a plurality of tenants. In such embodiments, portions of database 102 are allocated to each of the plurality of tenants such that tenants are not able to access other tenants' information in database 102. As discussed herein in further detail in connection to FIG. 3, some fields of database 102 are standardized fields that are used by multiple tenants, but some fields of database 102 are custom fields that are accessible only to a particular tenant.

User 120 is a human user accessing the computer system 100 who requests search request 122 in various embodiments. In various embodiments where computer system 100 is a multi-tenant computer system, user 120 is associated with a particular tenant. In such embodiments, user 120 can access some or all of the portion of database 102 allocated to the particular tenant, but user 120 cannot access portions of database 102 allocated to other tenants (unless the other tenants allow such access).

In various embodiments, the record of previous database accesses 104 is a record of the previous database entries accessed by a particular user 120. In various embodiments, the size of this record varies. In some embodiments, the last few hundred databases access are recorded and analyzed as discussed herein. In various embodiments, by analyzing only the most recent (e.g., the two hundred most recent) database entries selected by user 120, computer system 100 may be better able to estimate the recent affinities of user 120 without the previous access history potentially influencing the ranking of search results in a way that makes the ranking of search results 110 less relevant to the user's 120 current affinities. For example, if a user 120 has been accessing database 102 for six months as part of a role associated with a first region of the country (and was therefore accessing database entries associated with the first region) but starting one month ago is now doing work associated with a second region of the country (and is therefore now accessing database entries associated with the second region), factoring in the previous six months' worth of database entries may elevate irrelevant search results associated with the first region. As another example, if a user 120 typically services customers in a first industry (e.g., the high-tech industry) but was asked to fill in for another user's rule and is now temporarily servicing customers in a second industry (e.g., the healthcare industry), the more recent accesses by user 120 will likely reflect the change. Moreover, because the previous database access 104 are analyzed and not, for example, a record about the user 120 himself or herself (e.g., their human resources file) such changes in behavior do not need to be recorded in an official file for the change in behavior to be detected and used to rank search results. Thus, if user 120 is usually based in Texas and sells to customers based in Texas, but embarks on a sales trip to California to sell to customers in California (and is accessing database entries associated with California), the fact that the user's 120 address record with human resources says "Texas" will not affect the search results 110. The functions of weight module 106 and search module 108 are discussed in further detail herein in reference to FIGS. 2A and 2B.

In various embodiments, the disclosed techniques enable computer system 100 to rank search results 110 for search request 122 based on a plurality of previous database accesses 104 by user 120. As discussed in further detail herein, by ranking search results based on an analysis of the previous database entries accessed by user 120, computer system 100 is able to better anticipate the particular search results that, according to a model trained using the previous database accesses 104, are predicted to be most relevant to user 120 and to move these search results to toward the top of the list of search results 110. Because the analysis discussed herein is based on weights calculated based on the recent selections made by the user 120, the ranking of the search results 110 is more likely to reflect the current activities of user 120. Moreover, because the analysis techniques discussed herein are based on the frequency of same values appearing in database entries selected by user 120, computer system 100 does not need to have an understanding of the meaning of the contents of the various database fields. If, for example, a particular database field is a custom field for the flavors of ice creams purchased by customers who are recorded in a database, computer system 100 does not need to understand the significance of vanilla versus chocolate ice cream. Instead, computer system 100 determines the frequency of appearances of vanilla versus chocolate in database entries selected by user 120 (e.g., 80% vanilla and 20% chocolate) and, using this frequency, determines that user 120 has a higher affinity for vanilla and boosts results associated with vanilla accordingly. For example, if a user searches for "Acme" and two search results are identified, a first "Acme" associated with vanilla and a second "Acme" associated with chocolate, the Acme associated with vanilla will be ranked ahead of the Acme associated with chocolate in search results 110. Thus, in various embodiments, the different field value weights determined for a user 120 is based on the relative frequency of various values in the field throughout the record of previous database accesses 104.

In various embodiments, the disclosed techniques are also useable to determine which database fields are predicted to be more relevant to user 120 in evaluating a list of search results 110 to identify a particular database entry being sought. If a first field is weighted higher than a second field, search matches in the first field will be ranked higher than search matches in the second field. For example, if a user searches for "Acme" and "Acme" appears in a first result with "Acme" in the Company Name field and a second result with "Acme" in the "Address" field, the first result will be ranked higher when the Company Name field has a greater weight than the Address field. Similarly, if a user searches for "Acme" and there are two search matches: a first "Acme" that is associated with vanilla ice cream and Texas and a second "Acme" that is associated with chocolate ice cream and California, the order of the two Acmes will be determined by the weight of the field values (e.g., vanilla versus chocolate, Texas versus California) and the weight of the fields (e.g., ice cream flavor versus location). The field weight may be determined by various factors including but not limited to a frequency of database entries in the record of previous database accesses 104 in which the most frequently-selected field value for that user 120 (or other users associated with the same tenant) is present, whether the database field is included in the customize search results view for user 120 or the tenant with which user 120 is associated, such frequencies and/or customized search results for other users and/or other tenant, or any combination.

Figure 2A:
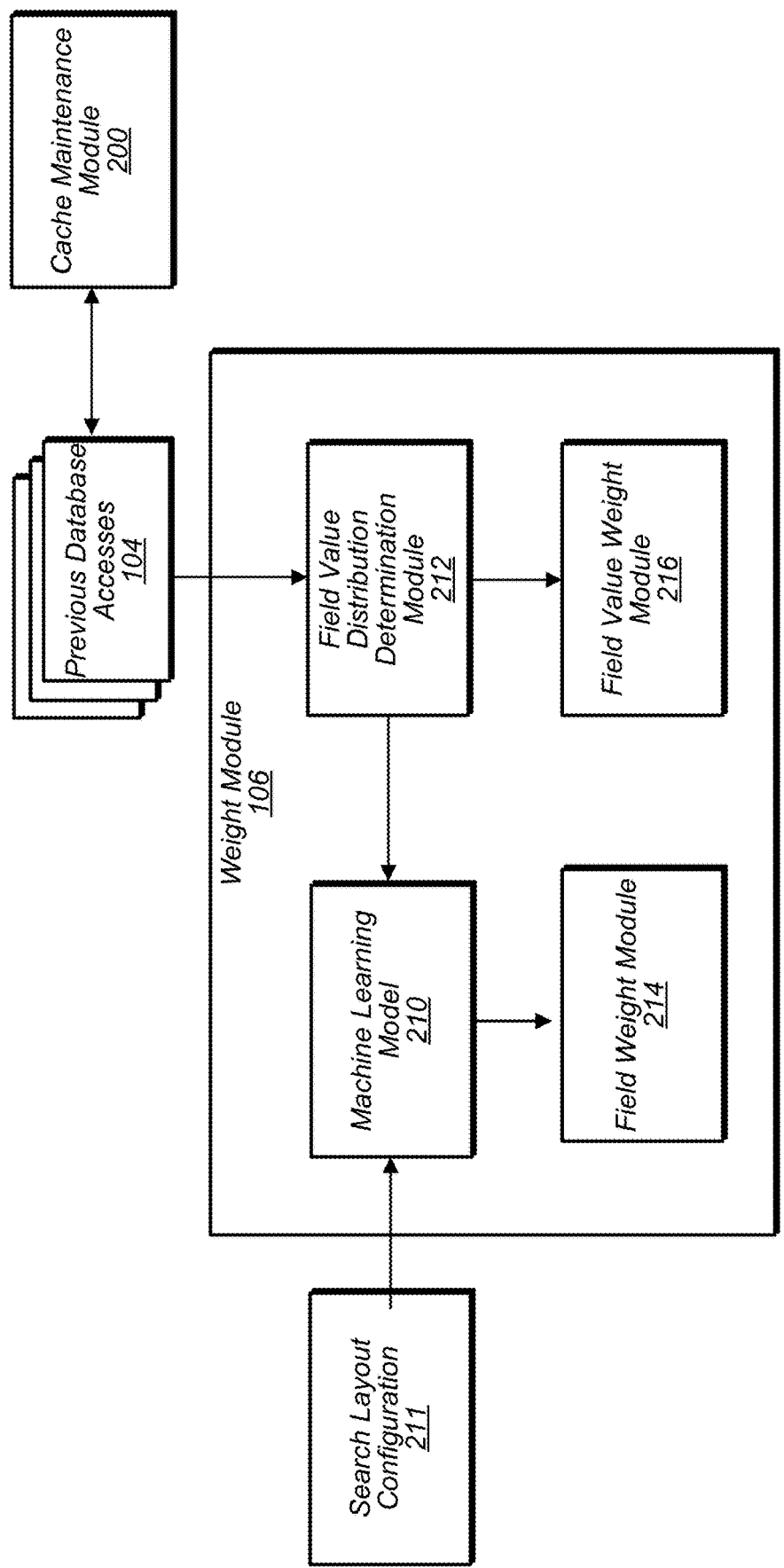
FIGS. 2A-2B are expanded block diagrams of the various components of FIG. 1 in accordance with various embodiments.

Referring now to FIG. 2A, an expanded block diagram of weight module 106 is depicted. The record of previous database accesses 104 is maintained by a cache maintenance module 200 in various embodiments. In such embodiments, cache maintenance module 200 adds accesses to the record when user 120 accesses database entries (e.g., via accessing a database entry as a result of a search through database 102) and, in embodiments, removes accesses from the record of previous database accesses 104 (e.g., after a certain amount of time, in a first-in, first-out caching paradigm in which the oldest access is removed when a new access is added).

In various embodiments, weight module 106 includes a field value distribution determination module 212, a machine learning model 210, a field weight module 214, and a field value weight module 216. In various embodiments, field value distribution determination module 212 is executable to analyze the record of previous database accesses 104 and determines the frequency of various same values of the various fields of the record (e.g., the number of times "vanilla" and "chocolate" occur in the Ice Cream Flavor field in database accesses in user's 120 record of previous database accesses 104). In various embodiments, field value distribution determination module 212 is also is executable to analyze the frequency in which the user's 120 most frequently selected field value for each particular field is present in each particular database access (e.g., the frequency which the most common field value "vanilla" occurs in the "Ice Cream" field in all of the database entries selected by user 120 in the record of previous database accesses 104).

In various embodiments, machine learning model 210 receives the frequencies calculated by field value distribution determination module 212 and also receives an indication 211 of which field value are included in the search result layout for user 120 (and/or the tenant with which user 120 is associated). In various embodiments, machine learning model 210 receives field value frequencies and search result configuration indications for other users (including users associated with the same tenant as user 120 and/or users associated with other tenants). Machine learning model 210 is any of a number of iterative machine learning algorithms in various embodiments, and may be trained with the data received once at the outset, regularly, or every time a user 120 access a database entry. Machine learning model 210 generates field weights for the various database fields in records selected by user 120 as recorded in previous database accesses 104 and outputs the field weights to field weight module 214. Field value weight module 216 is executable to receive the frequencies from field value distribution determination module 212 and uses the frequencies to calculate field value weights. In various embodiments, field value weight module 216 is executable to transform the frequencies (e.g., a logarithmic transformation, an exponential transformation, a multiplicative transformation) as part of calculating the field value weights.

Figure 2B:
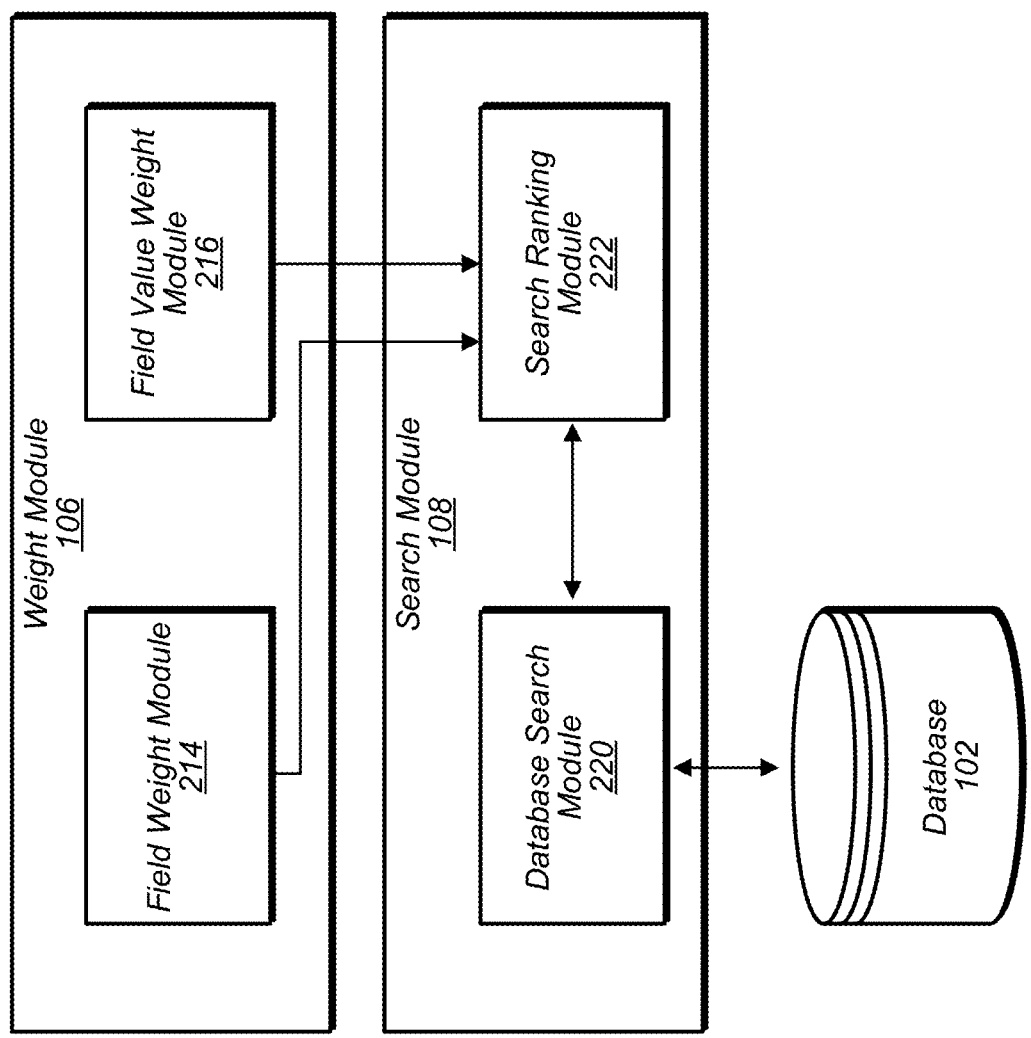

Referring now to FIG. 2B, an expanded block diagram of search module 108 is depicted. Database search module 220 is executable to receive search request 122 and perform a search of database 102. In various embodiments, database search module 220 is executable to perform any of a number of suitable searches including full match semantic searches, partial match semantic searches, searches for specific database fields, searches with Boolean operators, etc. Regardless of the type of search performed, database search module 220 is executable to output a set of search results to search ranking module 222. In various embodiments, database search module 220 is executable to automatically search for results as user 120 is entering a search phrase to automatically complete the search phrase with the highest ranked result. For example, referring to FIG. 5A, the highest ranked result is "Acme Grocery, Inc." In this instance, as user 120 types "Acme" in a search text box, database search module 220 is executable, in various embodiments, to perform the search for "Acme" while and to automatically complete the phase "Acme Grocery, Inc." in the search text box while user 120 is typing.

Search ranking module 222 is executable to rank various search results that have been output by database search module 220 using field value weights and/or field weights output by field value weight module 216 and field weight module 214, respectively. In various embodiments, the search results are ranked by a total score for each search result calculated using the following formula:

$$\text{Total} = (\text{Field Value Weight}_1) \times (\text{Field Weight}_1) + (\text{Field Value Weight}_2) \times (\text{Field Weight}_2) \ldots + (\text{Field Value Weight}_n) \times (\text{Field Weight}_n)$$

In various other embodiments, search results may be ranked according to other calculations including but not limited to the average (Field Value Weight)×(Field Weight) for the search result, the median (Field Value Weight)×(Field Weight) for the search result, etc. Search results 110 are prepared and ordered according to the rank calculated by search ranking module 222.

Referring now to FIGS. 3, 4A, 4B, 5A, and 5B, a simple example of a database 102, record of previous database accesses 104, calculated weights, and search results are depicted. Referring now to FIG. 3, a database of twelve database entries of the Customer Name of various customers, their Location, the Contact person for the customer, the Nearest Sales Office, and the Purchased Flavor is depicted. While only twelve total database entries with six database fields are depicted, it will be understood that database 102 may include hundreds, thousands, or millions (or any number) of database records and tens or hundreds (or any number) of database fields in various embodiments. The database 102 depicted in FIG. 3 may be associated with a particular tenant of a multi-tenant system with access restricted to just the users designated by the particular tenant. In various embodiments, some database fields such as Customer Name and Location are common across the multi-tenant database and Nearest Sales Office and Purchased Flavor are custom fields for a particular tenant. As discussed herein, the various weighting techniques disclosed herein are agnostic to the meaning of the various values in the various fields in various embodiments.

Referring now to FIG. 4A, a record of previous database accesses 104 of the five most recent database accesses by user 120 are shown. As discussed herein, the record may include any number of previous database accesses (e.g., tens, hundreds, thousands). Various repeated values in the record of previous database accesses 104 shown in FIG. 4A are shown in bold typeface or italic typeface. As discussed herein, for example, "Vanilla" is present in four out of five previous database accesses (e.g., 80%) in the Purchased Flavor database field and "New York" is present in three out of five previous database access (e.g., 60%).

Referring now to FIG. 4B, a table 400 showing field weights and field value weights for the various fields and field values is shown. The Purchased Flavor database field, for example, has been assigned a weight of 4 (e.g., the greatest weight in table 400) according to the determination of computer system 100 (e.g., by machine learning model 210 and field weight module 214). The various field value weights are indicated below and are calculated based on the frequency of the particular value in the record of previous database accesses 104 depicted in FIG. 4A. Thus, "Vanilla" has a weight of 0.8 and "New York" has a weight of 0.6, for example.

Figure 5C:
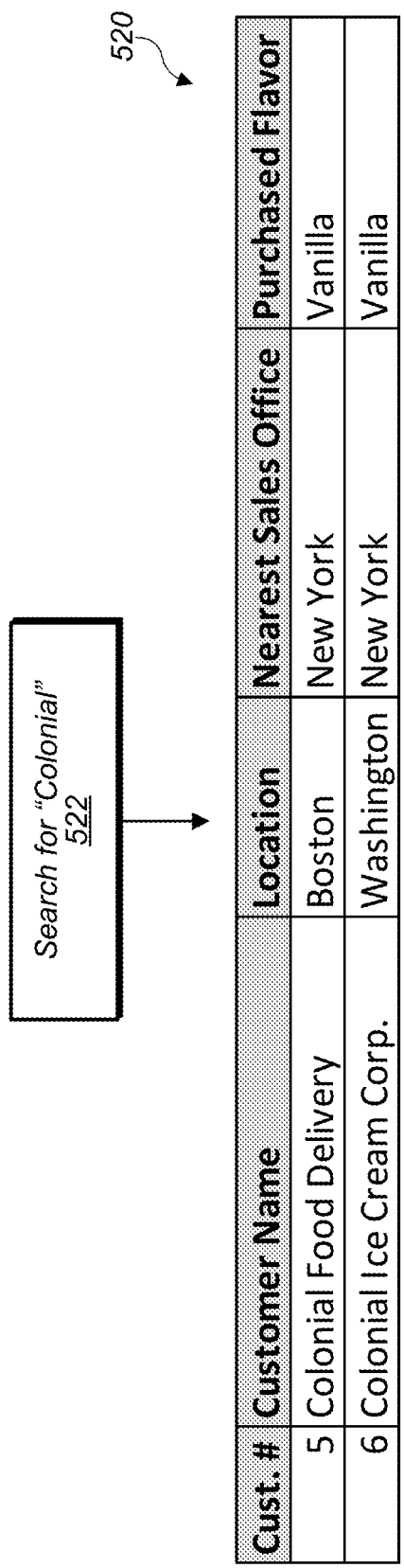

Referring now to FIGS. 5A-5C various search results 110 prepared from the database 102 depicted in FIG. 3 for various search requests 122 are shown. Referring now to FIG. 5A, at block 502, user 120 has searched for "Acme." There are four search results shown in results 500. Based on the weights shown in FIG. 4B, computer system 100 has ranked the result for Acme Grocery, Inc. first because of the weights of Vanilla in the Purchased Flavor field and Austin in the Location field. Acme Ice Cream Trucks is ranked next because of the weight of Vanilla in the Purchased Flavor field and Acme Ice Cream Parlor is ranked third because of the weight of New York in the Nearest Sales Office field.

Referring now to FIG. 5B, at block 512, user 120 has searched for "Austin." There are four search results shown in results 510. Acme Grocer, Inc. is ranked first, again, because of the weight of Vanilla in the Purchased Flavor field.

Referring now to FIG. 5C, at block 522, user 120 has searched for "Colonial." Here, the search results fields have been customized and are different than FIGS. 5A and 5B, excluding the "Contact" field. Accordingly, the weights for one or more of the field values is adjusted accordingly such that fields that appear in the customized search results field have greater weight than field that do not appear. Here, Colonial Food Delivery is ranked first because of the weight of Boston in the Location field.

Figure 6:
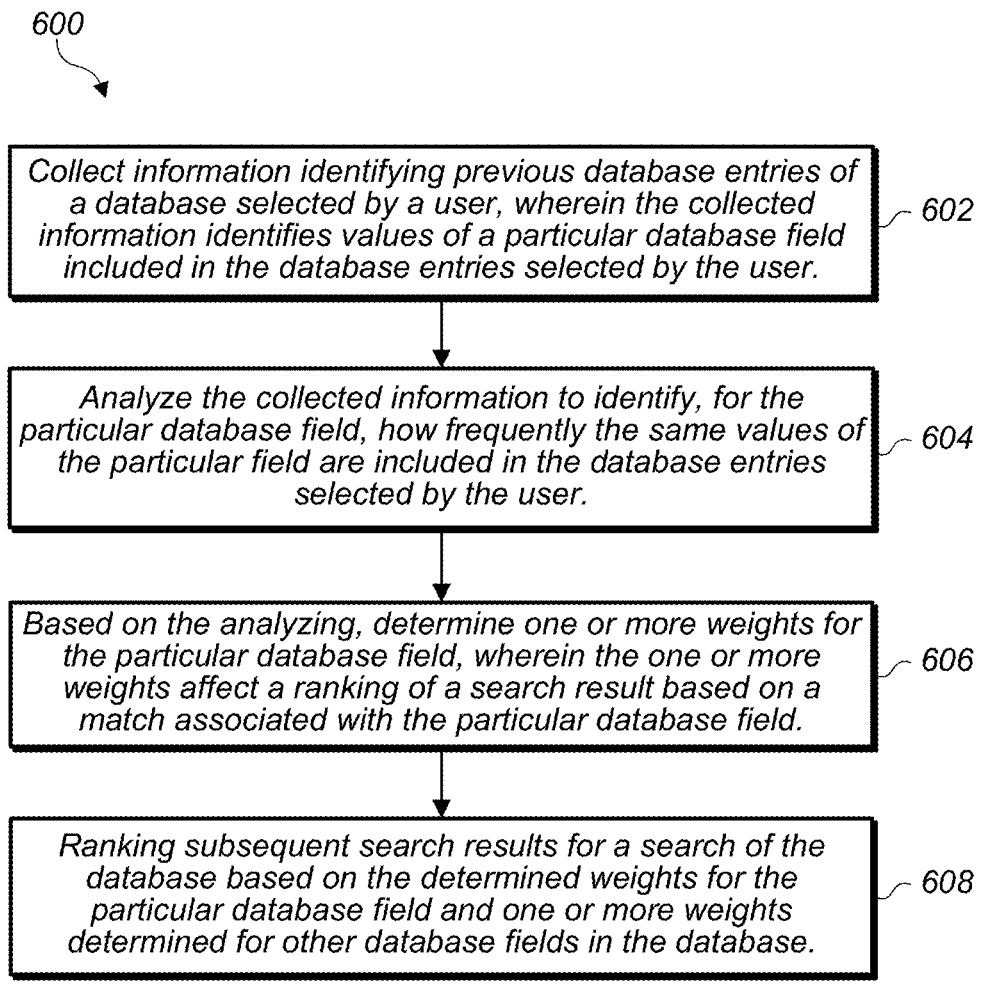
FIG. 6 is a flowchart illustrating an embodiment of a search ranking method in accordance with the disclosed embodiments.

Referring now to FIG. 6, a flowchart illustrating an embodiment of a search ranking method 600 is shown. In various embodiments, the various actions associated with method 600 are performed with computer system 100. At block 602, computer system 100 collects information identify previous database entries (e.g., stored as previous database accesses 104) of database 102 selected by user 120. In various embodiments, the collected information identifies values of a particular database field included in the database entries (e.g., in database 102) selected by user 120. At block 604, computer system 100 analyzes the collected information to identify, for the particular database field, how frequently the same values of the particular field are included in the database entries selected by user 120. At block 606, based on the analyzing, computer system 100 determines one or more weights for the particular database field. In various embodiments, the one or more weights affect a ranking of a search result 110 based on a match associated with the particular database field. At block 608, computer system 100 ranks subsequent search results 110 for a search of the database 102 based on the determined weights for the particular database field and one or more weights determined for other database fields in the database 102.

Figure 7:
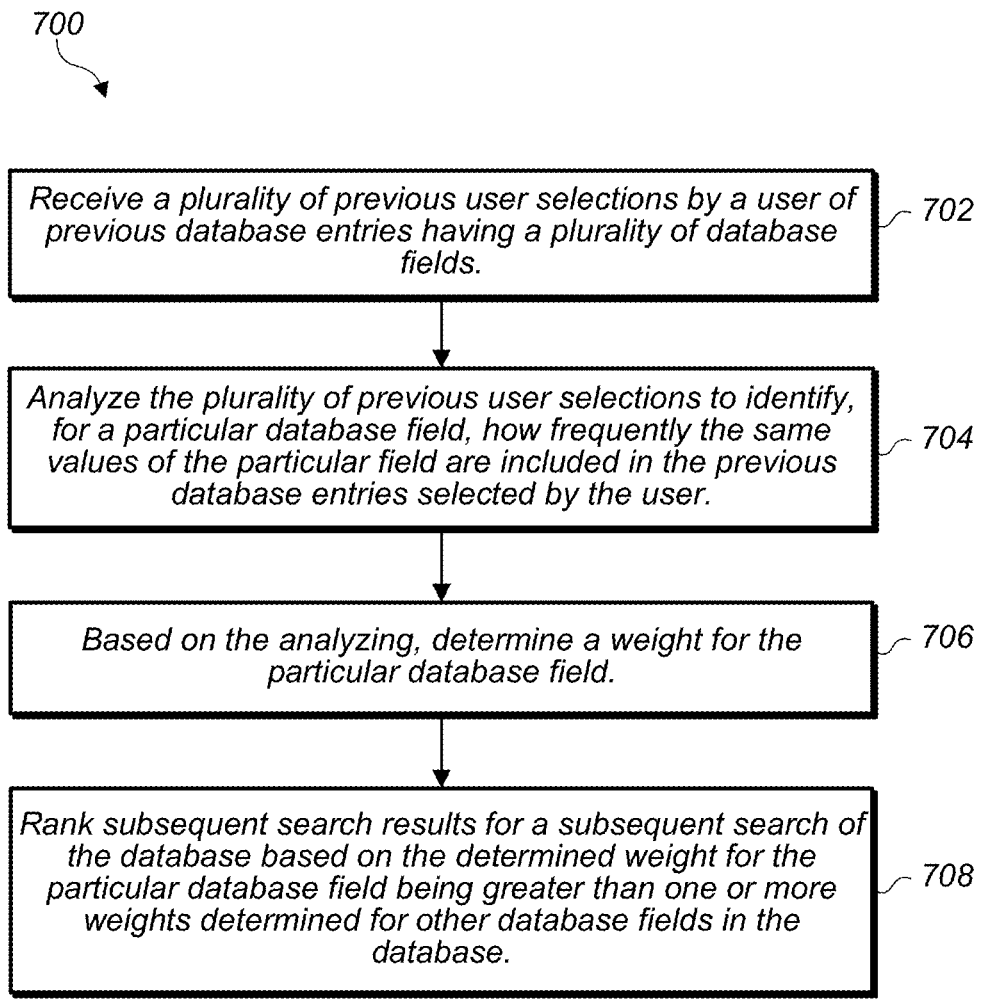
FIG. 7 is a flowchart illustrating an embodiment of a search ranking method in accordance with the disclosed embodiments.

Referring now to FIG. 7, a flowchart illustrating an embodiment of a search ranking method 700 is shown. In various embodiments, the various actions associated with method 700 are performed with computer system 100. At block 702, computer system 100 receives a plurality of previous user selections (e.g., previous database accesses 104) by user 120 of previous database entries of a database 102 having a plurality of database fields. At block 704, computer system 100 analyzes the plurality of previous user selections to identify, for a particular database field, how frequently the same values of the particular field are included in the previous database entries selected by user 120. At block 706, computer system 100 determines, based on the analyzing, a weight for the particular database field. At block 708, computer system 100 ranks subsequent search results 110 for a subsequent search of the database 102 based on the determined weight for the particular database field being greater than one or more weights determined for other database fields in the database 102.

Exemplary Computer System

Figure 8:
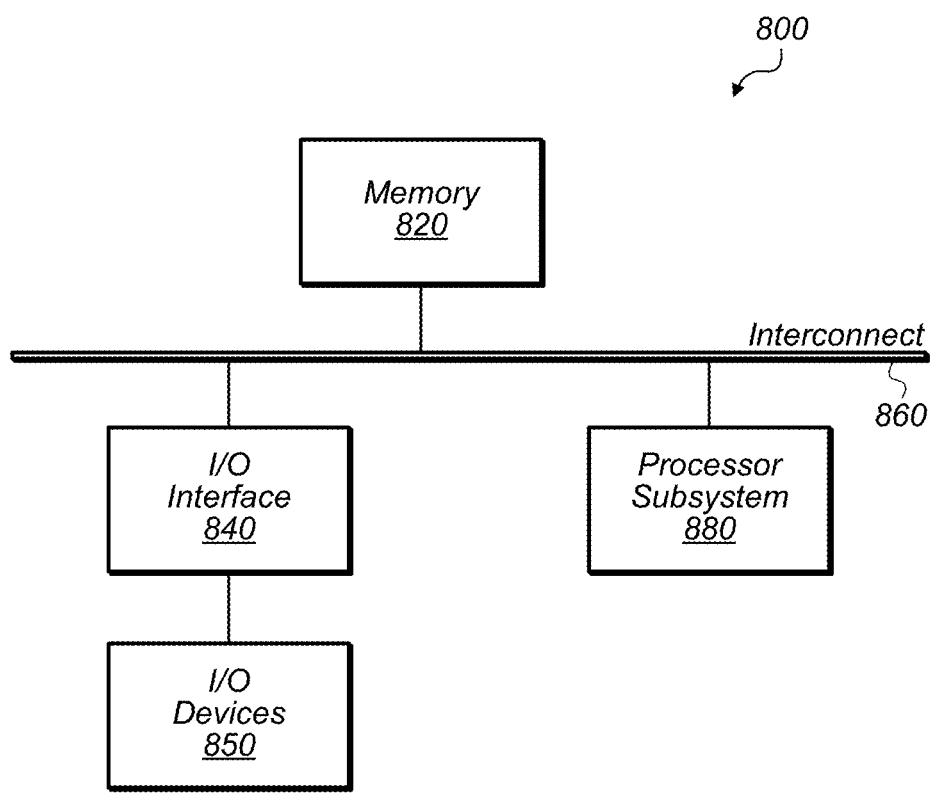
FIG. 8 is a block diagram of an exemplary computer system, which may implement the various components of FIGS. 1, 2A, and 2B.

Turning now to FIG. 8, a block diagram of an exemplary computer system 800, which may implement the various components of computer system 100 (e.g., database 102, weight module 106. search module 108) is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   collecting, by a computer system, information identifying previous database entries of a database selected by a user, wherein the collected information identifies values of a particular database field included in the database entries selected by the user;
   analyzing, by the computer system, the collected information to identify, for the particular database field, how frequently the same values of the particular field are included in the database entries selected by the user;
   based on the analyzing, determining, by the computer system, one or more weights for the particular database field, wherein the one or more weights affect a ranking of a search result based on a match associated with the particular database field; and
   ranking, by the computer system, subsequent search results for a search of the database based on the determined one or more weights for the particular database field and one or more weights determined for other database fields in the database.

2. The method of claim 1,
   wherein the one or more weights for the particular database field include one or more field value weights for particular values in the particular field and an overall field value weight;
   wherein the one or more field value weights are based on the frequency of the particular values in the particular database field in the collected information; and
   wherein the overall field value weight is based on the frequency of the greatest weighted of the particular values in the collected information.

3. The method of claim 1, further comprising:
   receiving, at the computer system, one or more customized search result layout settings specifying that one or more specified database fields are displayed to the user when the search results are displayed;
   wherein one or more weights for the particular database field are further based on the customized search result layout settings.

4. The method of claim 1, further comprising
   receiving, at the computer system, a string of characters input by the user; and
   determining, with the computer system, a predicted search request based on the inputted string of characters;
   wherein the search of the database is performed based on the predicted search request without a command from the user indicating that the string of characters is complete.

5. The method of claim 4, wherein determining the predicted search request is further based on the determined one or more weights for the particular database field and one or more weights determined for other database fields in the database.

6. The method of claim 1, further comprising:
   storing, at the computer system, metadata about the user including a first location associated with the user;
   wherein the same values of the particular field are indicative of a second location that is remote from the first location, and wherein the ranking includes ranking the subsequent search results such that search results indicative of the second location are ranked higher than search results indicative of the first location.

7. The method of claim 1, further comprising:
   receiving, at the computer system, a user selection of one of the search results; and
   updating, with the computer system, the collected information for use in ranking second search results for a second subsequent search by adding information identifying the selected one of the subsequent search results to the collected information and removing information identifying the database entry selected by the user the longest time ago.

8. The method of claim 1,
   wherein the computer system is a multi-tenant computer system having a plurality of tenants;
   wherein the user is associated with a particular tenant of the plurality of tenants; and
   wherein the particular database field is a custom database field accessible only to the particular tenant.

9. The method of claim 1,
   wherein the computer system is a multi-tenant computer system having a plurality of tenants, wherein the user is associated with a particular tenant of the plurality of tenants, and wherein a second user is associated with the particular tenant;
   the method further comprising:
   determining, by the computer system, weights for database fields in the database based on search activity of the second user;
   wherein the determined weights for database fields in the database associated with the user differ from the determined weights for database fields in the database associated with the second user.

10. The method of claim 1, wherein the subsequent search of the database is performed based on a search request for information not stored in the particular field.

11. The method of claim 1, wherein determining the one or more weights for the particular database field is based only on how frequently the same values of the particular field are included in the database entries selected by the user relative to how frequently other values of other database fields in the database are included in the database entries selected by the user.

12. A non-transitory computer-readable medium having program instructions stored thereon that are executable by a computer system to cause the computer system to perform operations comprising:

collecting, by the computer system, information identifying previous database entries of a database selected by a user, wherein the collected information identifies values of a first database field included in the database entries selected by the user and values of a second database field included in the database entries selected by the user;

analyzing, by the computer system, the collected information to:
- identify, for the first database field, how frequently the same values of the first field are included in the database entries selected by the user, and
- identify, for the second database field, how frequently the same values of the second field are included in the database entries selected by the user; and based on the analyzing, determining, by the computer system, a first weight for the first database field and a second weight for the second database field, wherein the first weight affects a ranking of a first search result based on a first match associated with the first database field and the second weight affect a ranking of a second search result based on a second match associated with the second database field.

13. The computer-readable medium of claim 12, the operations further comprising:
ranking subsequent search results for a subsequent search of the database based on the first weight and the second weight;
wherein the ranking includes:
- ranking search results associated with the first database field above search results associated with the second database field when the first weight is greater than the second weight; and
- ranking search results associated with the second database field above search results associated with the first database field when the second weight is greater than the first weight.

14. The computer-readable medium of claim 12, the operations further comprising:
ranking subsequent search results for a subsequent search of the database based on the first weight and the second weights;
wherein the ranking includes:
- ranking search results associated with both the first database field and second database field above search results associated just the first database field or just the second database field.

15. The computer-readable medium of claim 12, the operations further comprising:
receiving one or more customized search result layout settings specifying that one or more specified database fields are displayed to the user when the search results are displayed;
wherein the first weight and second weight are further based on the customized search result layout settings.

16. The computer-readable medium of claim 12,
wherein the computer system is a multi-tenant computer system have a plurality of tenants;
wherein the user is associated with a particular tenant of the plurality of tenants; and
wherein the first database field and second database field are custom database fields accessible only to the particular tenant.

17. A method comprising:
receiving, at a computer system, a plurality of previous user selections by a user of previous database entries of a database having a plurality of database fields;
analyzing, by the computer system, the plurality of previous user selections to identify, for a particular database field, how frequently the same values of the particular field are included in the previous database entries selected by the user;
based on the analyzing, determining, by the computer system, a weight for the particular database field; and
ranking, by the computer system, subsequent search results for a subsequent search of the database based on the determined weight for the particular database field being greater than one or more weights determined for other database fields in the database.

18. The method of claim 17,
wherein the computer system is a multi-tenant computer system having a plurality of tenants;
wherein the user is associated with a particular tenant of the plurality of tenants; and
wherein the particular database field is a custom database field accessible only to the particular tenant.

19. The method of claim 17, further comprising:
receiving, at the computer system, one or more customized search result layout settings specifying that one or more specified database fields are displayed to the user when the search results are displayed;
wherein the ranking is further based on the customized search result layout settings.

20. The method of claim 17, wherein determining the weight for the particular database field is based only on how frequently the same values of the particular field are included in the search results selected by the user relative to how frequently other values of other database fields in the database are included in the search results.

* * * * *